(12) United States Patent
Kamp et al.

(10) Patent No.: US 11,028,923 B2
(45) Date of Patent: Jun. 8, 2021

(54) HIGH VIBRATION PNEUMATIC PISTON ASSEMBLY MADE FROM ADDITIVE MANUFACTURING

(71) Applicant: Hamilton Sundstrand Corporation, Windsor Locks, CT (US)

(72) Inventors: Josh Kamp, Glastonbury, CT (US); Donald E. Army, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 370 days.

(21) Appl. No.: 14/736,799

(22) Filed: Jun. 11, 2015

(65) Prior Publication Data

US 2016/0363221 A1   Dec. 15, 2016

(51) Int. Cl.

| | | |
|---|---|---|
| *F16H 21/44* | (2006.01) | |
| *F16J 1/00* | (2006.01) | |
| *F16J 1/14* | (2006.01) | |
| *F15B 15/14* | (2006.01) | |
| *F15B 15/06* | (2006.01) | |
| *B22F 5/00* | (2006.01) | |
| *F16K 31/122* | (2006.01) | |
| *B33Y 10/00* | (2015.01) | |
| *B33Y 80/00* | (2015.01) | |

(52) U.S. Cl.
CPC ............... *F16J 1/14* (2013.01); *B22F 5/008* (2013.01); *F15B 15/066* (2013.01); *F15B 15/1447* (2013.01); *F15B 15/1457* (2013.01); *F16H 21/44* (2013.01); *F16J 1/001* (2013.01); *F16K 31/122* (2013.01); *B33Y 10/00* (2014.12); *B33Y 80/00* (2014.12)

(58) Field of Classification Search
CPC ...... F16J 1/001; F16J 1/005; F16J 1/14; F16J 1/16; F16J 7/00; F15B 15/066; F15B 15/1447; F15B 15/1457
USPC ......................... 74/50, 22 R, 25, 89; 251/58
See application file for complete search history.

(56) References Cited

U.S. PATENT DOCUMENTS

| | | | | |
|---|---|---|---|---|
| 3,146,681 | A * | 9/1964 | Sheesley | ............... F15B 15/066 92/13.5 |
| 3,195,420 | A * | 7/1965 | Johannsen | ............... F01B 9/026 123/197.1 |
| 3,452,961 | A * | 7/1969 | Forsman | ............... F15B 15/066 251/232 |

(Continued)

FOREIGN PATENT DOCUMENTS

| | | |
|---|---|---|
| EP | 3045791 A1 | 7/2016 |
| FR | 2133249 A5 | 11/1972 |

(Continued)

OTHER PUBLICATIONS

Gao et al., "The status, challenges, and future of additive manufacturing in engineering", Computer-Aided Design, vol. 69, Dec. 2015. (Year: 2015).*

(Continued)

*Primary Examiner* — Bobby Rushing, Jr.
(74) *Attorney, Agent, or Firm* — Kinney & Lange, P.A.

(57) ABSTRACT

A piston assembly includes a piston with a first cap disposed on a first end of the piston and a second cap disposed on a second end of the piston. A piston cross-member is in between the first cap and the second cap. A cover is formed with the piston cross-member and extends between the first cap and second cap.

15 Claims, 4 Drawing Sheets

(56) References Cited

U.S. PATENT DOCUMENTS

| | | | | |
|---|---|---|---|---|
| 3,709,106 A * | 1/1973 | Shafer | F01B 1/12 | 251/58 |
| 3,737,142 A * | 6/1973 | Boswell | F15B 21/02 | 251/58 |
| 3,760,480 A * | 9/1973 | Tupker | F16K 1/221 | 29/445 |
| 3,877,677 A * | 4/1975 | Daghe | F16K 1/221 | 251/228 |
| 4,075,898 A * | 2/1978 | Carlson, Jr. | F16K 31/502 | 74/50 |
| 4,132,510 A * | 1/1979 | Takahashi | B26D 7/086 | 417/534 |
| 4,261,546 A * | 4/1981 | Cory | F16K 31/1655 | 251/229 |
| 4,337,691 A * | 7/1982 | Tomaru | F15B 15/066 | 251/58 |
| 4,373,876 A * | 2/1983 | Nemoto | F01B 1/08 | 417/534 |
| 4,485,768 A * | 12/1984 | Heniges | F01B 9/023 | 123/197.1 |
| 4,882,977 A * | 11/1989 | Himeno | F01B 9/04 | 403/337 |
| 5,000,077 A * | 3/1991 | Habicht | F15B 15/066 | 74/104 |
| 5,375,566 A * | 12/1994 | Brackett | F01B 9/023 | 123/197.1 |
| 5,494,135 A * | 2/1996 | Brackett | F01B 9/023 | 123/197.4 |
| 5,601,110 A | 2/1997 | Rembert et al. | | |
| 5,934,229 A * | 8/1999 | Li | F01B 9/023 | 123/192.2 |
| 6,887,585 B2 | 5/2005 | Herbst-Dederichs | | |
| 6,991,210 B2 * | 1/2006 | Hagiwara | F15B 11/0365 | 251/31 |
| 8,328,538 B2 * | 12/2012 | Smits | F04B 37/14 | 417/415 |
| 9,282,394 B1 * | 3/2016 | Clark | H04R 1/1008 | |
| 2012/0067166 A1 * | 3/2012 | Gewirtz | B25J 9/102 | 74/665 C |
| 2013/0076005 A1 * | 3/2013 | McDade | B62B 1/20 | 280/418.1 |
| 2014/0299091 A1 | 10/2014 | Ribeiro et al. | | |
| 2015/0047935 A1 | 2/2015 | Godfrey et al. | | |

FOREIGN PATENT DOCUMENTS

| | | | | |
|---|---|---|---|---|
| GB | 1460200 A * | 12/1976 | | F16K 1/221 |
| WO | 2015034628 A1 | 3/2015 | | |

OTHER PUBLICATIONS

Galinkski et al., "Insect-like flapping wing mechanism based on a double spherical Scotch yoke", Journal of the Royal Society, May 2005. (Year: 2005).*

Extended European Search Report, for European Patent Application No. 16174183.0, dated Nov. 2, 2016, 9 pages.

* cited by examiner

HIGH VIBRATION PNEUMATIC PISTON ASSEMBLY MADE FROM ADDITIVE MANUFACTURING

BACKGROUND

The present disclosure is directed generally to butterfly valves, and more specifically, to pistons used for actuation of butterfly valves.

Pneumatically actuated butterfly valves require a means for translating the pistons axial motion into rotary motion to control the position of the valve disc which is used to modulate the primary air flow. Typically a link with bearings at each end provides the connection between the piston and the crank arm which rotates the shaft for the butterfly disc. Often there are wear issues associated with the bearings at either end of the crank. Also, in high vibration environments like engine bleed systems, a piston torsional mode may be excited which leads to excessive piston ring wear. In such arrangements, the piston has the rotational inertia and the link provides the torsional stiffness.

SUMMARY

A piston assembly includes a piston with a first cap disposed on a first end of the piston and a second cap disposed on a second end of the piston. A piston cross-member is in between the first cap and the second cap. A cover is formed with the piston cross-member and extends between the first cap and second cap.

A piston assembly includes a piston with a first cap disposed on a first end of the piston and a second cap disposed on a second end of the piston. A piston cross-member is in between the first cap and the second cap. A cover is permanently formed with the piston cross-member and extends between the first cap and second cap. The cover includes a cutout, a first slot, and a second slot. A crank mechanism includes a shaft and a crank. A first end of the crank is affixed to the shaft. A second end of the crank is slidably and rotationally engaged with a third slot in the piston cross-member.

A method of additively manufacturing a piston assembly includes reading build instructions from a file stored in an electronic database. Material is deposited in accordance with the file. Layers of solid material are formed in accordance with the file. A piston with a cover including a cylindrical shape is formed. A piston cross-member is encased inside of the cover.

DETAILED DESCRIPTION

Figure 1:
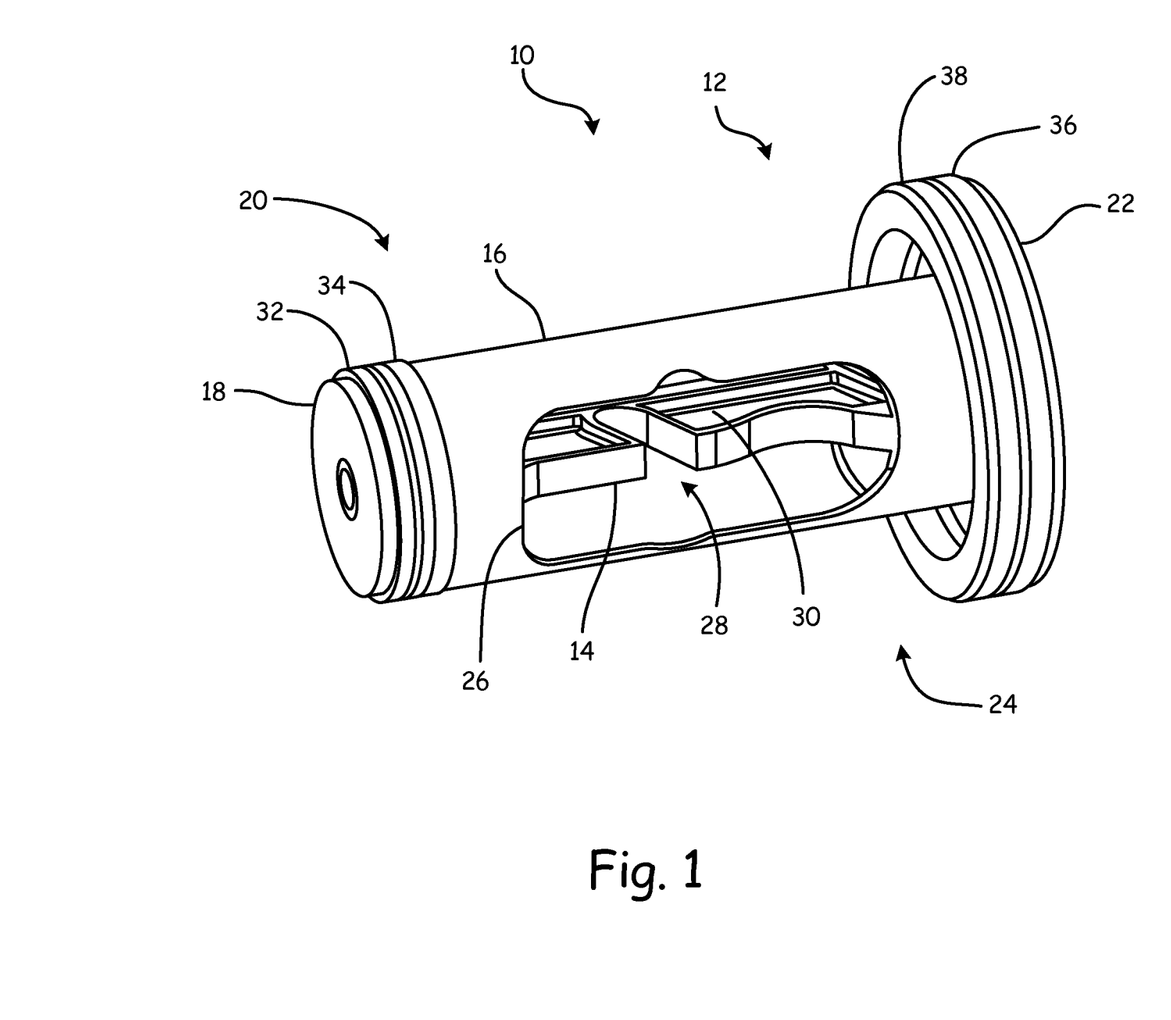
FIG. 1 is a perspective view of a piston assembly.

FIG. 1 is a perspective view of piston assembly 10. Piston assembly 10 generally includes piston 12, piston cross-member 14, and cover 16. First cap 18 is positioned at first end 20 of piston 12, and second cap 22 is positioned at second end 24 of piston 12. First cap 18 and second cap 22 can be attached to piston 12 by various attachment means, which may include threaded engagement, brazing, welding, and/or other types of mechanical or chemical adhesion. Piston assembly 10 can be used in a pneumatic butterfly valve for use in engine bleed air systems and/or other types of fluid valve arrangements. Piston assembly 10 often is positioned in systems which translate vibrational energy to piston assembly 10.

Cover 16 is formed with piston cross-member 14. Additive manufacturing may be used as one way to form cover 16 with piston cross-member 14. In order to additively manufacture piston assembly 10, instructions are read from a file stored in an electronic database, such as a computer, hard drive, or other electronic storage devices. The material for piston assembly 10 is then deposited in accordance with the file. The material for piston assembly 10 may include powdered metal, such as Inconel 718, Inconel 625, or other types of powdered metal suitable for additive manufacturing, and in particular for direct metal laser sintering ("DMLS") techniques. Layers of solid material are formed in accordance with the file. The layers can be formed through various types of additive manufacturing, which may include DMLS. Piston 12 is then formed with cover 16 permanently attached. Cover 16 is formed to encase piston cross-member 14 inside of cover 16.

Forming piston 12 with additive manufacturing significantly reduces the amount of surface needed to be machined. Regular machining of a piston similar to piston 12 would require large amounts of time, tooling, project management, etc., all of which are significantly reduced with additive manufacturing. Additive manufacturing piston 12 also reduces the part count of piston assembly 10 by eliminating multiple covers, attachment screws, datum features, inserts, etc. necessarily required if a traditional, non-additive, machining manufacturing method were used. Forming piston 12 as one single part through additive manufacturing also drastically reduces the amount of assembly time required to assembly piston 12 because without piston 12 being a single part, it would be necessary to take time to assemble a significant quantity of parts. Not so with additively manufactured piston 12 consisting of a single formed unit. Additionally, piston 12 provides a reduction in weight relative to a similar non-additively manufactured piston, and in particular can reduce the weight up to approximately 25%.

Cover 16 provides an increase in stiffness to piston 12 by absorbing and/or damping vibrations experienced by piston assembly 10 during operation of piston assembly 10. Cover 16 dampens vibrations experienced by piston assembly 10 by adding support to piston rod 14 along the areas where cover 16 comes into contact with piston rod 14. The additional support to piston rod 14 from cover 16 decreases the amount of torsional strain on piston 12 due to operating environment vibrations experienced by piston assembly 10. Cover 16 is hollow and can generally include a cylindrical shape, and may include other shapes or patterns (such as a hollow tube or tubular shape as seen in FIGS. 1-4) designed to optimize the vibrational characteristics of piston assembly 10. The outer diameter of cover 16 is similar to the width of piston rod 14 for a proper tolerance stack-up allowing piston 12 to fit within a bore of a pump or valve without coming into contact with the bore during operation of the pump.

Specifically, the addition of cover 16 increases the natural frequency of piston 12. The natural frequency, or the frequency at which an object tends to oscillate in the absence of a driving or damping force, of piston 12 without cover 16 can be between 100-1,150 hz. This can be a problem because the typical vibrational mode of the operating environment surrounding piston assembly 10 can include torsional modes within the range of 100-1,150 hz. When the natural frequency of piston 12 falls within the operating environment's torsional mode range, the amplitude of the torsional mode of piston 12 can increase drastically causing potential wear and potential damage to piston 12 and other components of piston assembly 10.

The addition of cover 16 to piston 12 results in increasing a natural frequency of piston 12 and piston assembly 10 to at least 2,000 hz. Specifically, the natural frequency of piston 12 and piston assembly 10 may be increased to greater than 2,300 hz with the addition of cover 16 to piston 12.

A benefit of attaching cover 16 to piston 12 is to increase the resonant frequencies associated with piston 12 and piston assembly 10 to well above any frequency source in the valve operating environment. This increase in natural frequency of piston 12 significantly reduces the wear typically seen in high vibration environments where piston assembly 10 will be used and will also reduce piston ring wear and crank mechanism wear.

Cover 16 includes cutout 26. As will be discussed with respect to FIGS. 2-3, cutout 26 will allow a crank mechanism to engage and operate with piston assembly 10.

Figure 3:
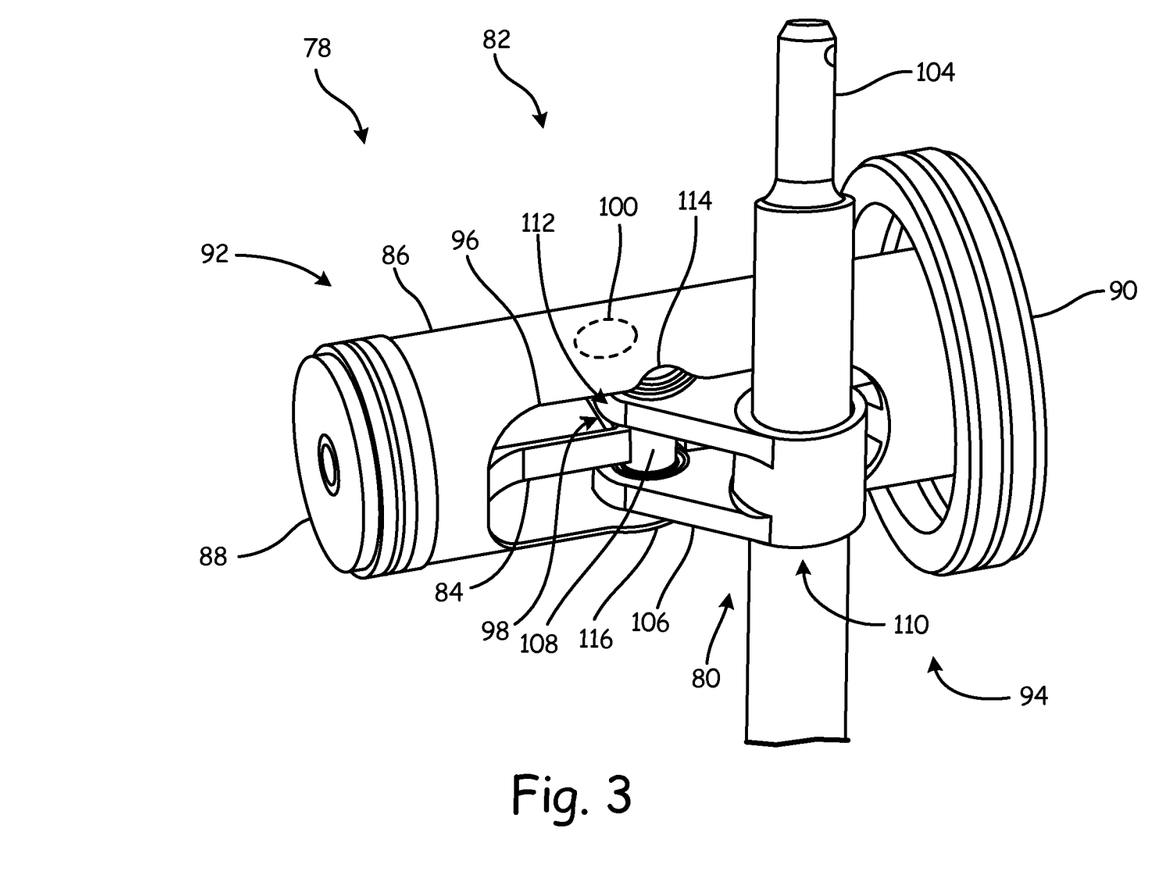
FIG. 3 is a perspective view of a piston assembly with a crank mechanism.
Figure 4:
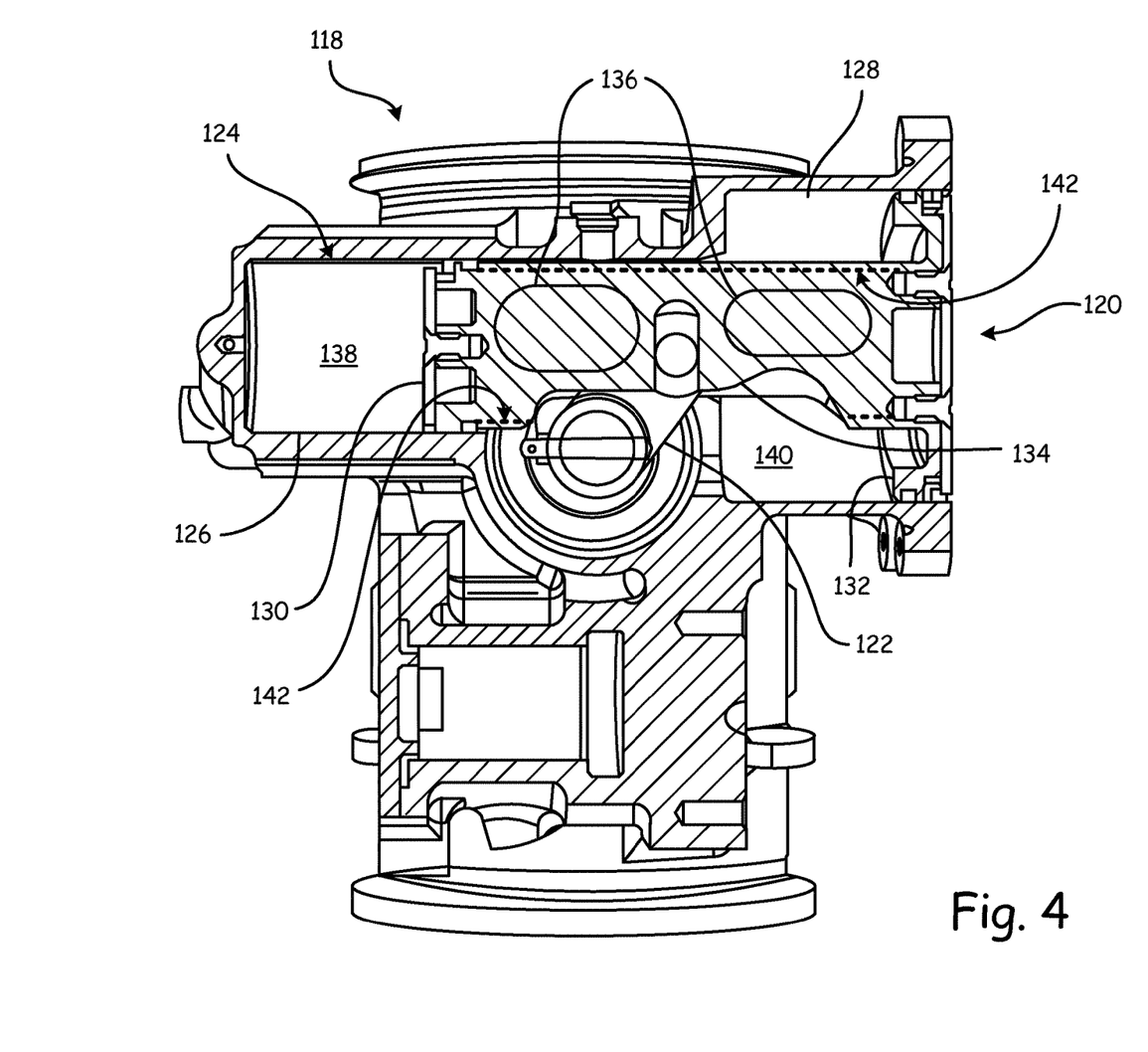
FIG. 4 is an elevation sectional view of a valve with a piston assembly and a crank mechanism.

Piston cross-member 14 also includes slot 28 on one side of piston cross-member 14. Slot 28 is open on a side of piston cross-member 14 to receive a crank mechanism, as shown in FIGS. 3-4. To further reduce weight, portions of piston cross-member 14 can optionally include hollowed out portions defining one or more areas of webbing 30. The location, size, and shape of webbing 30 can also be designed to optimize the vibrational characteristics of piston 12 and piston assembly 10.

Piston assembly 10 also includes first piston ring 32 and first rider ring 34 located at first end 20 of piston 12. Additionally, piston assembly 10 also includes second piston ring 36 and second rider ring 38 located at second end 24 of piston 12. First piston ring 32 and second piston ring 36 form a seal with the valve (not shown) to create a sealed environment within the valve. First rider ring 34 and second rider ring 38 provide radial support of piston 12 within the valve.

Figure 2:
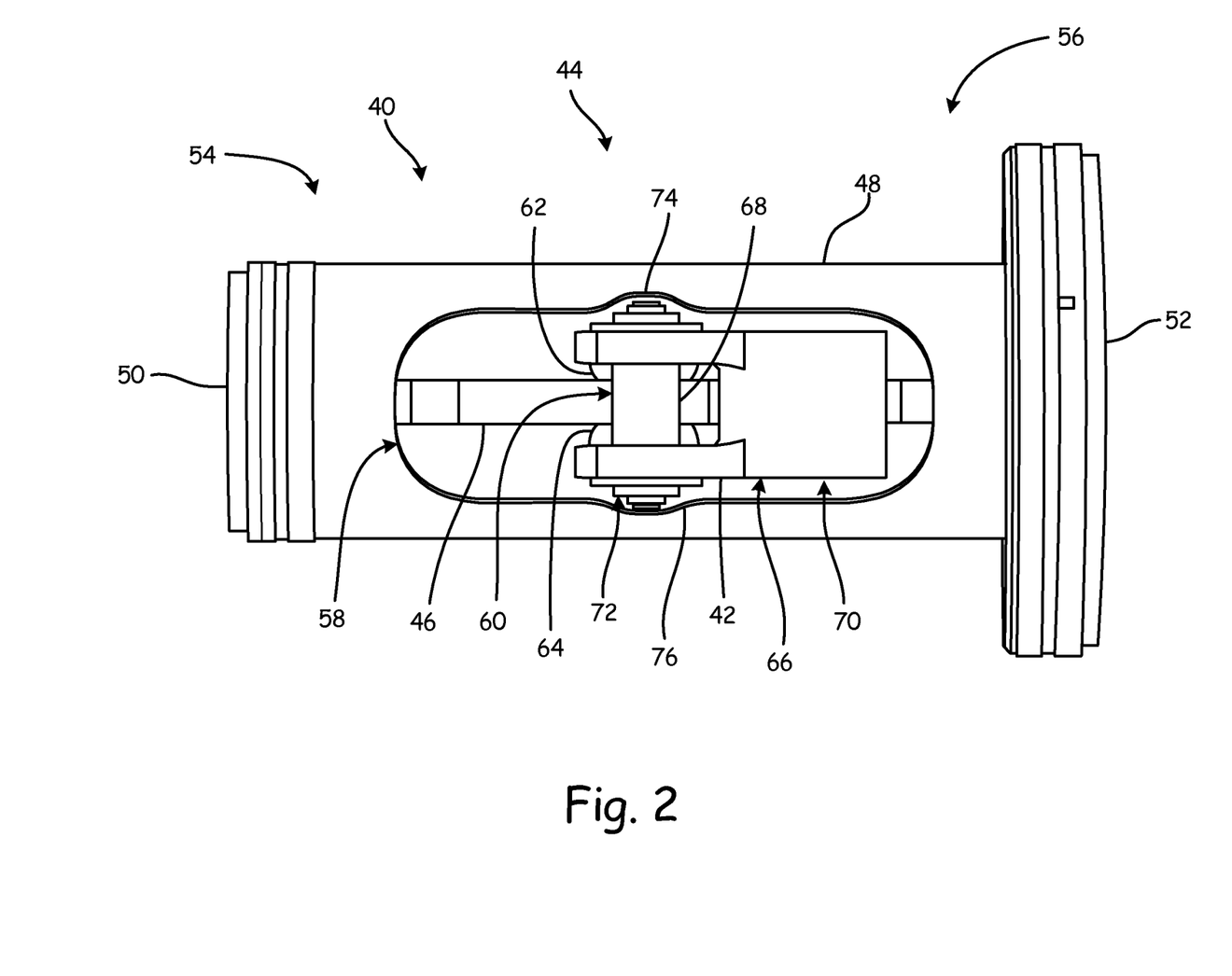
FIG. 2 is an elevation view of a piston assembly with a crank mechanism.

FIG. 2 is an elevation view of piston assembly 40 with crank mechanism 42. Piston assembly 40 includes piston 44, piston cross-member 46, cover 48, first cap 50, and second cap 52. Cover 48 is permanently formed to piston cross-member 46. First cap 50 is attached to first end 54 of piston 44 and second cap 52 is attached to second end 56 of piston 44. Cover 48 includes cutout 58. Piston cross-member 46 includes engagement slot 60 which is configured to attach piston 44 to crank mechanism 42. Cover 48 includes first slot 62 and second slot 64.

Crank mechanism 42 includes crank arm 66 and crank pin 68. First end 70 of crank arm 66 is connected to a shaft (not shown in FIG. 2). Second end 72 of crank arm includes crank pin 68 for engagement with engagement slot 60 of piston cross-member 46. Crank pin 68 slidably and rotationally engages with engagement slot 60 of piston cross-member 46 to enable linear actuation of piston 44 within a bore of a valve (not shown). Crank pin 68 rotates relative to crank arm 66 and slides relative to engagement slot 60. This type of crank mechanism is commonly known as a Scotch yoke crank mechanism.

Cover 48 additionally includes first notch 74 and second notch 76. First notch 74 and second notch 74 provide openings in cutout 58 to allow for installation of crank mechanism 42 into piston cross-member 46. First notch 74 and second notch 76 provide clearance for the top and bottom of crank pin 68 to enter into cover 48 during installation of crank mechanism 42 onto piston assembly 40.

FIG. 3 is a perspective view of piston assembly 78 with crank mechanism 80. Piston assembly 78 includes piston 82, piston cross-member 84, cover 86, first cap 88, and second cap 90. Cover 86 is formed to piston cross-member 84. First cap 88 is attached to first end 92 of piston 82 and second cap 90 is attached to second end 94 of piston 82. Cover 86 includes cutout 96. Piston cross-member 84 includes engagement slot 98 which is configured to attach piston 82 to crank mechanism 80. Cover 86 includes first slot 100 and a second slot (not shown in FIG. 3).

Crank mechanism 80 includes shaft 104, crank arm 106, and crank pin 108. First end 110 of crank arm 106 is connected to shaft 104. Second end 112 of crank arm 106 includes crank pin 108 for engagement with engagement slot 98 of piston cross-member 84. Crank pin 108 slidably and rotationally engages with engagement slot 98 of piston cross-member 84 to enable linear actuation of piston 82 within a bore of a valve (not shown). Crank pin 108 rotates relative to crank arm 106 and slides relative to engagement slot 98. This type of crank mechanism is commonly known as a Scotch yoke crank mechanism.

Cutout 96 additionally provides an opening in cover 86 for crank arm 106 to enter into piston 82 and engage with engagement slot 98 of piston cross-member 84. Additionally, cutout 96 provides clearance for shaft 104 during actuation of piston assembly 78. As can be seen in the perspective view of piston assembly 78 in FIG. 3, the shape of cutout 96 allows shaft 104 to actuate along a path inset from an outer diameter of piston cross-member 84 and/or first end 92 of piston 82.

Cover 86 additionally includes first notch 114 and second notch 116. First notch 114 and second notch 116 provide openings in cutout 96 to allow for installation of crank mechanism 80 into piston cross-member 84. First notch 114 and second notch 116 provide clearance for the top and bottom of crank pin 108 to enter into cover 86 during installation of crank mechanism 80 onto piston assembly 78.

FIG. 4 is an elevation sectional view of valve 118 with piston assembly 120 and crank mechanism 122. Piston assembly 120 is positioned inside of valve 118 in bore 124. Bore 124 includes first bore end 126 and second bore end 128. First bore end 126 includes a smaller diameter than second bore end 128. Piston assembly 120 includes first end 130 positioned in first bore end 126 and second end 132 of piston assembly 120 is positioned in second bore end 128.

Here, piston assembly 120 has a pair of longitudinally opposed pistons, first piston 130 and second piston 132, with piston rod 134 connected therebetween. Piston rod 134 is shown solid but can be weight-reduced to include webbing 136. As can be seen in FIG. 4, webbing 136 is a sheet of solid material such that webbing 136 does not form a hole or holes passing through piston rod 134. First piston 130 and second piston 132 are disposed in corresponding supply portion 138 and servo portion 140 respectively of bore 124. First piston 130 and second piston 132 can have a different active surface area so as to tailor opening and closing forces. Actuation force, such as closing force, can be provided or supplemented by a torque motor (not shown). This is described in more detail with reference to commonly assigned U.S. patent application entitled "VIBRATION TOLERANT BUTTERFLY VALVE", Ser. No. 14/599,898 filed on Jan. 19, 2015. However, it will be appreciated by those skilled in the art that certain embodiments of the presently disclosed subject matter does not require a housing or actuator configuration as is described in the incorporated application.

Piston assembly 120 includes cover 142. Cover 142 is formed with piston assembly 120. Additive manufacturing may be used as one way to form cover 142 with piston assembly 120. In order to additively manufacture piston assembly 120, instructions are read from a file stored in an electronic database, such as a computer, hard drive, or other electronic storage devices. The material for piston assembly 120 is then deposited in accordance with the file. The material for piston assembly 120 may include powdered metal, such as Inconel 718, Inconel 625, or other types of powdered metal suitable for additive manufacturing, and in particular for direct metal laser sintering ("DMLS") techniques. Layers of solid material are formed in accordance with the file. The layers can be formed through various types of additive manufacturing, which may include DMLS. Piston assembly 120 is then formed with cover 142 permanently attached. Cover 142 is formed to encase piston assembly 120 inside of cover 142.

Forming piston assembly 120 with additive manufacturing significantly reduces the amount of surface needed to be machined. Regular machining of a piston similar to piston assembly 120 would require large amounts of time, tooling, project management, etc., all of which are significantly reduced with additive manufacturing. Additive manufacturing piston assembly 120 also reduces the part count of piston assembly 120 by eliminating multiple covers, attachment screws, datum features, inserts, etc. necessarily required if a traditional, non-additive, machining manufacturing method were used. Forming piston assembly 120 as one single part through additive manufacturing also drastically reduces the amount of assembly time required to assembly piston assembly 120 because without piston assembly 120 being a single part, it would be necessary to take time to assemble a significant quantity of parts. Not so with additively manufactured piston assembly 120 consisting of a single formed unit. Additionally, piston assembly 120 provides a reduction in weight relative to a similar non-additively manufactured piston, and in particular can reduce the weight up to approximately 25%.

Cover 142 provides an increase in stiffness to piston assembly 120 by absorbing and/or damping vibrations experienced by piston assembly 120 during operation of piston assembly 120. Cover 142 dampens vibrations experienced by piston assembly 120 by adding support to piston assembly 120 along the areas where cover 142 comes into contact with piston assembly 120. The additional support to piston assembly 120 from cover 142 decreases the amount of torsional strain on piston assembly 120 due to operating environment vibrations experienced by piston assembly 120. Cover 142 is hollow and can generally include a cylindrical shape, and may include other shapes or patterns (such as a hollow tube or tubular shape as seen in FIGS. 1-4) designed to optimize the vibrational and weight characteristics of piston assembly 120. The outer diameter of cover 142 is similar to the width of piston assembly 120 for a proper tolerance stack-up allowing piston assembly 120 to fit within bore 124 of valve 118 without coming into contact with valve 118 during operation of the pump.

Specifically, the addition of cover 142 increases the natural frequency of piston assembly 120. The natural frequency, or the frequency at which an object tends to oscillate in the absence of a driving or damping force, of piston assembly 120 without cover 142 can be between 100-1,150 hz. This can be a problem because the typical vibrational mode of the operating environment surrounding piston assembly 120 can include torsional modes within the range of 100-1,150 hz. When the natural frequency of piston assembly 120 falls within the operating environment's torsional mode range, the amplitude of the torsional mode of piston assembly 120 can increase drastically causing potential wear and potential damage to piston assembly 120 and other components of piston assembly 120.

The addition of cover 142 to piston assembly 120 results in increasing a natural frequency of piston assembly 120 to at least 2,000 hz. Specifically, the natural frequency of piston assembly 120 may be increased to greater than 2,300 hz with the addition of cover 142 to piston assembly 120.

A benefit of attaching cover 142 to piston assembly 120 is to increase the resonant frequencies associated with piston assembly 120 to well above any frequency source in the valve operating environment. This increase in natural frequency of piston assembly 120 significantly reduces the wear typically seen in high vibration environments where piston assembly 120 will be used and will also reduce piston ring wear and crank mechanism wear.

Discussion of Possible Embodiments

The following are non-exclusive descriptions of possible embodiments of the present disclosure.

A piston assembly may include a piston with a first cap disposed on a first end of the piston and a second cap disposed on a second end of the piston. A piston cross-member may be in between the first cap and the second cap. A cover may be formed with the piston cross-member and may extend between the first cap and second cap.

The piston assembly of the preceding paragraph can optionally include, additionally and/or alternatively, any one or more of the following features, configurations and/or components:

- a further embodiment of the foregoing piston assembly, wherein the piston assembly may be attached to a crank mechanism including a shaft and a crank;
- a further embodiment of the foregoing piston assembly, wherein the piston assembly may further include a cutout in the cover;
- a further embodiment of the foregoing piston assembly, wherein a first end of the crank may be affixed to the shaft, and a second end of the crank may be slidably and rotationally engaged with a slot in the piston cross-member;
- a further embodiment of the foregoing piston assembly, wherein the piston cross-member may include at least one webbing;
- a further embodiment of the foregoing piston assembly, wherein the cover may include a cylindrical shape;
- a further embodiment of the foregoing piston assembly, wherein the piston may include a natural frequency of at least 2,000 hz;
- a further embodiment of the foregoing piston assembly, wherein the piston may include a natural frequency of at least 2,300 hz;
- a further embodiment of the foregoing piston assembly, wherein the cover and the piston may form a single additively manufactured object; and/or
- a further embodiment of the foregoing piston assembly, wherein the crank mechanism may include a Scotch yoke crank mechanism.

An alternative embodiment of a piston assembly may include a piston with a first cap disposed on a first end of the piston and a second cap disposed on a second end of the piston. A piston cross-member may be between the first cap and the second cap. A cover may be permanently formed with the piston cross-member and may extend between the first cap and second cap. The cover may include a cutout, a first slot, and a second slot. A crank mechanism may include a shaft and a crank. A first end of the crank may be affixed to the shaft. A second end of the crank may be slidably and rotationally engaged with a third slot in the piston cross-member.

The piston assembly of the preceding paragraph can optionally include, additionally and/or alternatively, any one or more of the following features, configurations and/or additional components:

a further embodiment of the foregoing piston assembly, wherein the cover may include a cylindrical shape;

a further embodiment of the foregoing piston assembly, wherein the piston may include a natural frequency of at least 2,000 hz; and/or a further embodiment of the foregoing piston assembly, wherein the piston may include a natural frequency of at least 2,300 hz.

A method of additively manufacturing a piston assembly may include reading build instructions from a file stored in an electronic database. Material may be deposited in accordance with the file. Layers of solid material may be formed in accordance with the file. A piston with a cover including a cylindrical shape may be formed. A piston cross-member may be encased inside of the cover.

The method of additively manufacturing a piston assembly of the preceding paragraph can optionally include, additionally and/or alternatively, any one or more of the following features, configurations and/or additional components:

a further embodiment of the foregoing method of additively manufacturing a piston assembly may include attaching a Scotch yoke crank mechanism including a shaft and a crank to the piston cross-member;

a further embodiment of the foregoing method of additively manufacturing a piston assembly, wherein attaching a Scotch yoke crank mechanism may include slidably and rotationally engaging a first end of the crank with a slot in the piston cross-member and affixing a second end of the crank to the shaft;

a further embodiment of the foregoing method of additively manufacturing a piston assembly may include setting a natural frequency of the piston assembly to at least 2,000 hz;

a further embodiment of the foregoing method of additively manufacturing a piston assembly may include setting a natural frequency of the piston assembly to at least 2,300 hz; and/or a further embodiment of the foregoing method of additively manufacturing a piston assembly may include forming the piston assembly through direct metal laser sintering.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A piston assembly comprising:
    a piston including a first cap disposed on a first end of the piston and a second cap disposed on a second end of the piston;
    a piston cross-member in between the first cap and the second cap, wherein the piston cross-member comprises a hollowed out portion defining a webbing that is a sheet of solid material extending across a portion of the piston cross-member, wherein the webbing does not form a hole or holes passing through the piston cross-member, wherein a thickness of the webbing is less than a thickness of other portions of the piston cross-member so as to provide weight reduction;
    a cover formed with the piston cross-member, wherein the cover extends between the first cap and second cap, wherein the cover is hollow and is in a shape of a hollow tube that extends an entire length of the cover, and further wherein the piston, piston cross-member, and cover form a single piece of additively manufactured material; and
    a crank mechanism including a shaft and a crank, wherein the piston cross-member is attached to the crank mechanism, and wherein a rotational axis of the shaft is disposed externally of the cover.

2. The piston assembly of claim 1 further including a cutout in the cover.

3. The piston assembly of claim 2, wherein a first end of the crank is affixed to the shaft, and a second end of the crank is slidably and rotationally engaged with a slot in the piston cross-member.

4. The piston assembly of claim 1, wherein the piston includes a natural frequency of at least 2,000 hz.

5. The piston assembly of claim 4, wherein the piston includes a natural frequency of at least 2,300 hz.

6. The piston assembly of claim 1, wherein the crank mechanism includes a Scotch yoke crank mechanism.

7. A method of additively manufacturing the piston assembly of claim 1, the method comprising:
    reading build instructions from a file stored in an electronic database;
    depositing material in accordance with the file;
    forming layers of solid material in accordance with the file; and
    forming the piston assembly.

8. The method of claim 7 further including attaching a Scotch yoke crank mechanism including a shaft and a crank to the piston cross-member.

9. The method of claim 8, wherein attaching the Scotch yoke crank mechanism includes slidably and rotationally engaging a first end of the crank with a slot in the piston cross-member and affixing a second end of the crank to the shaft.

10. The method of claim 7 further including setting a natural frequency of the piston assembly to at least 2,000 hz.

11. The method of claim 10 further including setting a natural frequency of the piston assembly to at least 2,300 hz.

12. The method of claim 7 further including forming the piston assembly through direct metal laser sintering.

13. A piston assembly comprising:
    a piston including a first cap disposed on a first end of the piston and a second cap disposed on a second end of the piston;
    a piston cross-member in between the first cap and the second cap; wherein the piston cross-member comprises a hollowed out portion defining a webbing that is a sheet of solid material extending across a portion of the piston cross-member, wherein the webbing does not form a hole or holes passing through the piston cross-member, wherein a thickness of the webbing is less than a thickness of other portions of the piston cross-member so as to provide weight reduction;

a cover integrally formed with the piston cross-member, the cover including a cutout with a first notch and a second notch disposed along top and bottom edges respectively of the cutout, and a first slot and a second slot, wherein the cover is hollow and is in a shape of a hollow tube that extends the entire length of the cover between the first cap and second cap, and further wherein the piston, piston cross-member, and cover form a single piece of additively manufactured material; and a crank mechanism including a shaft and a crank, wherein a first end of the crank is affixed to the shaft, and a second end of the crank is slidably and rotationally engaged with a third slot in the piston cross-member, and wherein a rotational axis of the shaft is disposed externally of the cover.

14. The piston assembly of claim 13, wherein the piston includes a natural frequency of at least 2,000 hz.

15. The piston assembly of claim 14, wherein the piston includes a natural frequency of at least 2,300 hz.

\* \* \* \* \*